(12) United States Patent
Lee et al.

(10) Patent No.: US 7,017,122 B1
(45) Date of Patent: Mar. 21, 2006

(54) METHOD FOR DISPLAYING MENU SCREEN OF VIDEO APPARATUS

(75) Inventors: Jae Kyung Lee, Daeku (KR); Ji Yeon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/533,762

(22) Filed: Mar. 23, 2000

(30) Foreign Application Priority Data

Mar. 24, 1999 (KR) ................................ 1999-10125

(51) Int. Cl.
*G06F 17/00* (2006.01)
(52) U.S. Cl. ...................... 715/812; 715/817; 715/810; 715/822; 715/825
(58) Field of Classification Search ................ 345/352, 345/817, 810, 812, 825; 715/812, 817, 810, 715/822, 825
See application file for complete search history.

(56) References Cited

U.S. PATENT DOCUMENTS

| | | | | |
|---|---|---|---|---|
| 5,425,140 A | * | 6/1995 | Bloomfield et al. | ......... 345/841 |
| 5,835,094 A | * | 11/1998 | Ermel et al. | ................. 345/419 |
| 5,914,717 A | * | 6/1999 | Kleewein et al. | ........... 345/843 |
| 6,133,911 A | * | 10/2000 | Kim | ............................ 345/719 |
| 6,154,750 A | * | 11/2000 | Roberge et al. | ............. 345/854 |
| 6,181,335 B1 | * | 1/2001 | Hendricks et al. | .......... 345/723 |

FOREIGN PATENT DOCUMENTS

| JP | 1206424 A | * | 8/1989 |
|---|---|---|---|
| JP | 4246720 A | * | 9/1992 |

* cited by examiner

*Primary Examiner*—Kristine Kincaid
*Assistant Examiner*—Peng Ke
(74) *Attorney, Agent, or Firm*—Birch, Stewart, Kolasch & Birch, LLP

(57) ABSTRACT

A method for displaying a menu screen of a video apparatus which displays images, in which a finally selected menu of the menus displayed on a screen is displayed in a predetermined color, and the upper menus corresponding to the path of the finally selected menu are displayed in the same color, which is different from the predetermined color, so that a user can easily recognize a menu currently selected by him or her and its processing path.

7 Claims, 6 Drawing Sheets

METHOD FOR DISPLAYING MENU SCREEN OF VIDEO APPARATUS

BACKGROUND OF THE INVENTION

1. Field of the Invention

The present invention relates to a video apparatus, and more particularly to a method for displaying a menu screen of a video apparatus such as a television set.

2. Description of the Background Art

As development of an video technique is progressed, currently, various video apparatuses such as a computer or a television set are gradually coming out of the technique that various menus related to the operation of the video apparatus are selected by keys provided in its main body, and instead, a method for selecting corresponding menus by using a few keys such as a direction key or a selection key with reference to a menu screen displayed in an OSD form is becoming generalized.

Accordingly, in order for users to facilitate the selection for the corresponding menus, it is requisite to develop a technique implementing the menu screen.

Especially, according to the development of a multimedia technique, as for the television set, the most popular video apparatus, the menu screen-related technique facilitating setting various functions as well as sound quality is the most critical factor in improving the competitive power of the product.

FIG. 1 shows a video apparatus in accordance with a conventional art, taking an example as a television set, which includes an antenna, a tuner 100 for selecting a broadcast signal; an audio signal processing unit 200 for processing an audio signal included in the broadcast signal; a speaker 300, a remote controller 400, a remote controller light receiving unit 500, a microcomputer 600 for controlling each element, displaying an operation state, and processing OSD signals for implementing a menu screen; an image signal selection unit 700 for selectively switching the broadcast image signal and the OSD signal outputted from the microcomputer 600; an image signal processing unit 800 for processing the broadcast image signal so as to be displayed on a screen; and a CRT 900.

Displaying the menu screen according to the conventional art constructed as described above will now be explained with reference to FIGS. 1 and 2.

First, the broadcast signal received through the antenna is converted to an intermediate frequency for a desired channel through the tuner 100 and then outputted as an image and audio signals.

And, the audio signal is processed by the audio signal processing unit 200 and outputted through the speaker 300.

Meanwhile, the image signal and the OSD signal for displaying the operation state or constructing the menu screen outputted from the microcomputer 600 are selectively switched under the control of the microcomputer 600 and then processed by the image signal processing unit 800, to be outputted to the CRT 900.

The microcomputer 600 receives an operation command through the remote controller light receiving unit 500 as inputted through the remote controller 500 by a user, and applies a control signal to each element, so as to perform the operation command of the user.

Referring to the menu screen of the television set in accordance with the conventional art, as the user pressed down a menu setting key, the microcomputer 600 receiving the corresponding key to thereby recognize the menu setting command of the user.

Subsequently, the image data for constructing the menu screen as pre-set is OSD signal-processed and outputted, and the OSD data is processed by the image selection unit 700 and the image signal processing unit 800, so as to be displayed on the CRT 900 as shown in FIG. 2A.

When the user selects a channel, that is, 'CH', of upper menus displayed on the menu screen, corresponding lower menus are also displayed as shown in FIG. 2B.

Here, 'INPUT' is a menu for selecting an external image input signal such a TV signal or a VCR signal, 'AUTO PROG' is a menu for automatically searching and memorizing a channel having a signal, 'MANUAL PROG' is a menu for manually searching and memorizing a channel having a signal, and 'FAVORITE CH' is a menu memorizing favorite channels of the user. In this respect, the menu selected by the user may have a different color in order to make difference from other menus.

As described above, as to the menu screen of the video apparatus of the conventional art, the lower menus of the menu selected by the user are additionally displayed or the color of the selected menu is varied, which is, however, not satisfying enough to easily recognize the menu selected by the user or a corresponding menu or a path of the corresponding menu, causing inconvenience for the user in selecting the menus.

SUMMARY OF THE INVENTION

Therefore, an object of the present invention is to provide a method for displaying a menu screen of a video apparatus which is capable of easily recognizing a menu currently selected by a user and its processing path.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the first embodiment of the present invention, the finally selected menu of the menu displayed on the menu screen is displayed in a predetermined color, and the upper menus corresponding to the path of the finally selected menu are displayed in the same colors, which is different to the predetermined color of the finally selected menu.

According to the second embodiment of the present invention, pairs of menus consisting of a predetermined menu of the menu screen and its corresponding lower menus are displayed in a single block having its own color, and finally selected menus are displayed in the different color from that of the other menus.

According to the third embodiment of the present invention, which is obtained by mixing the first and the second embodiments of the present invention, pairs of menus consisting of a menu selected by a user and its lower menus are displayed in a single block which is colored in a specific color, and the upper menus corresponding to the path of the finally selected menu are displayed in the same color, which is different from the display color of the finally selected menu.

Methods for display a menu screen of a video apparatus in accordance with the first, second and the third embodiments of the present invention will now be described with reference to the accompanying drawings.

Figure 1:
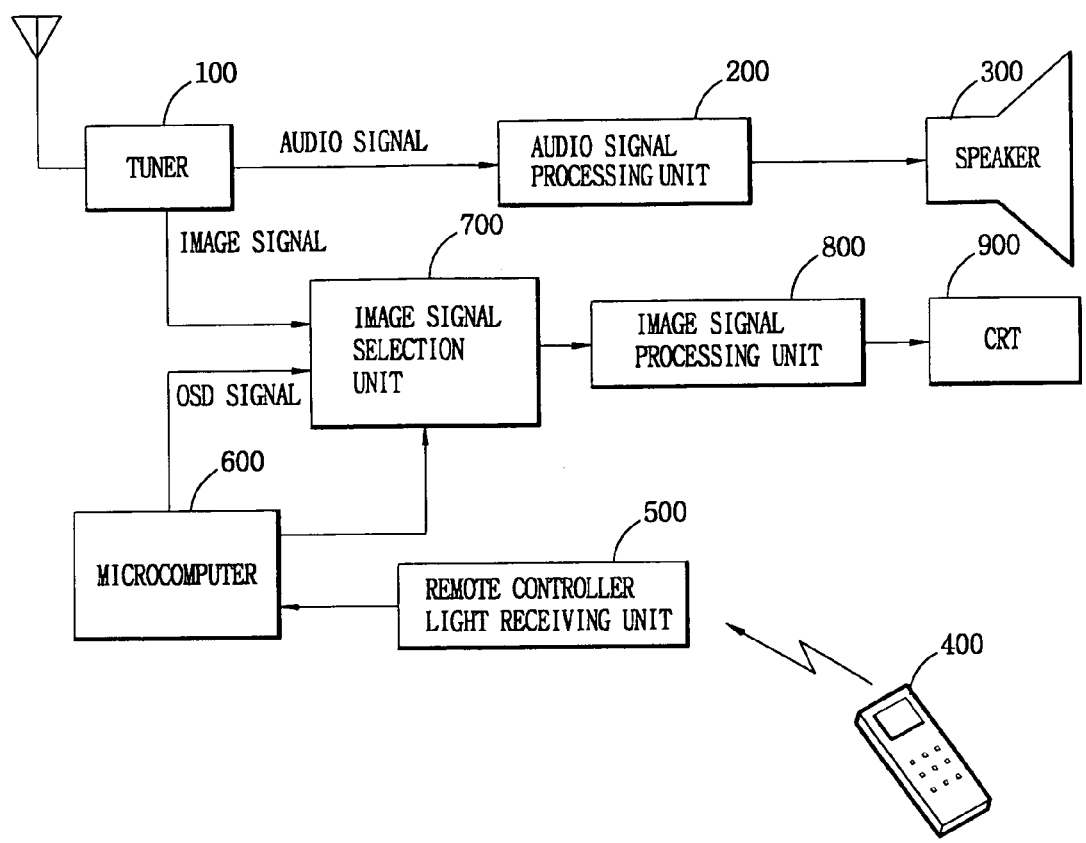
FIG. 1 is a schematic block diagram showing a construction of a television set in accordance with a conventional art.
Figure 2A:
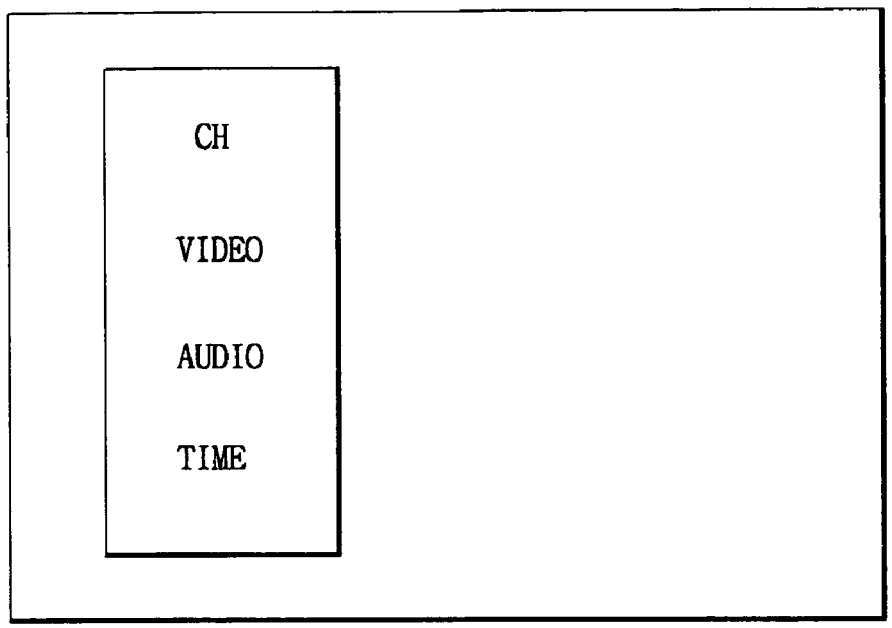
FIGS. 2A and 2B are exemplary view of menu screens of FIG. 1 in accordance with the conventional art.
Figure 2B:
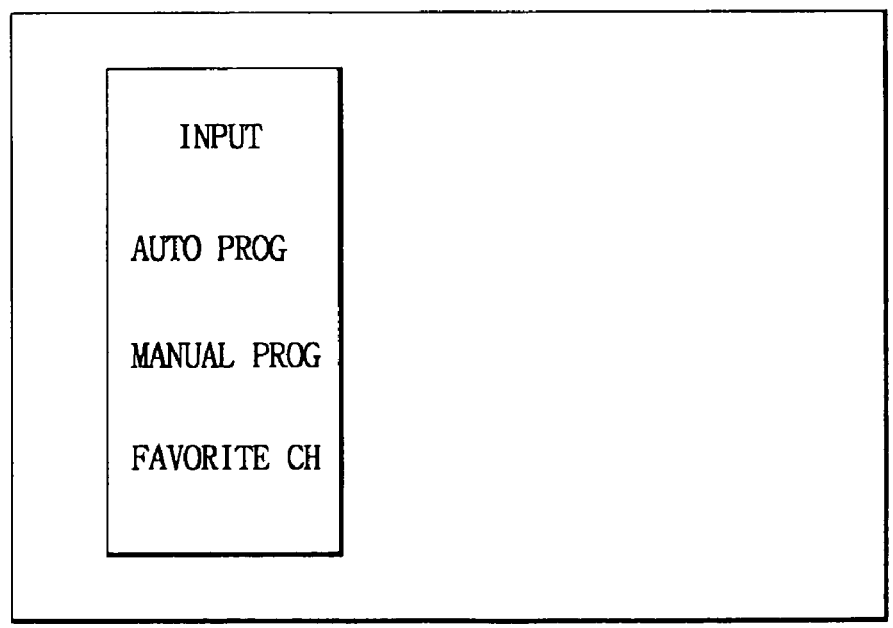
Figure 3:
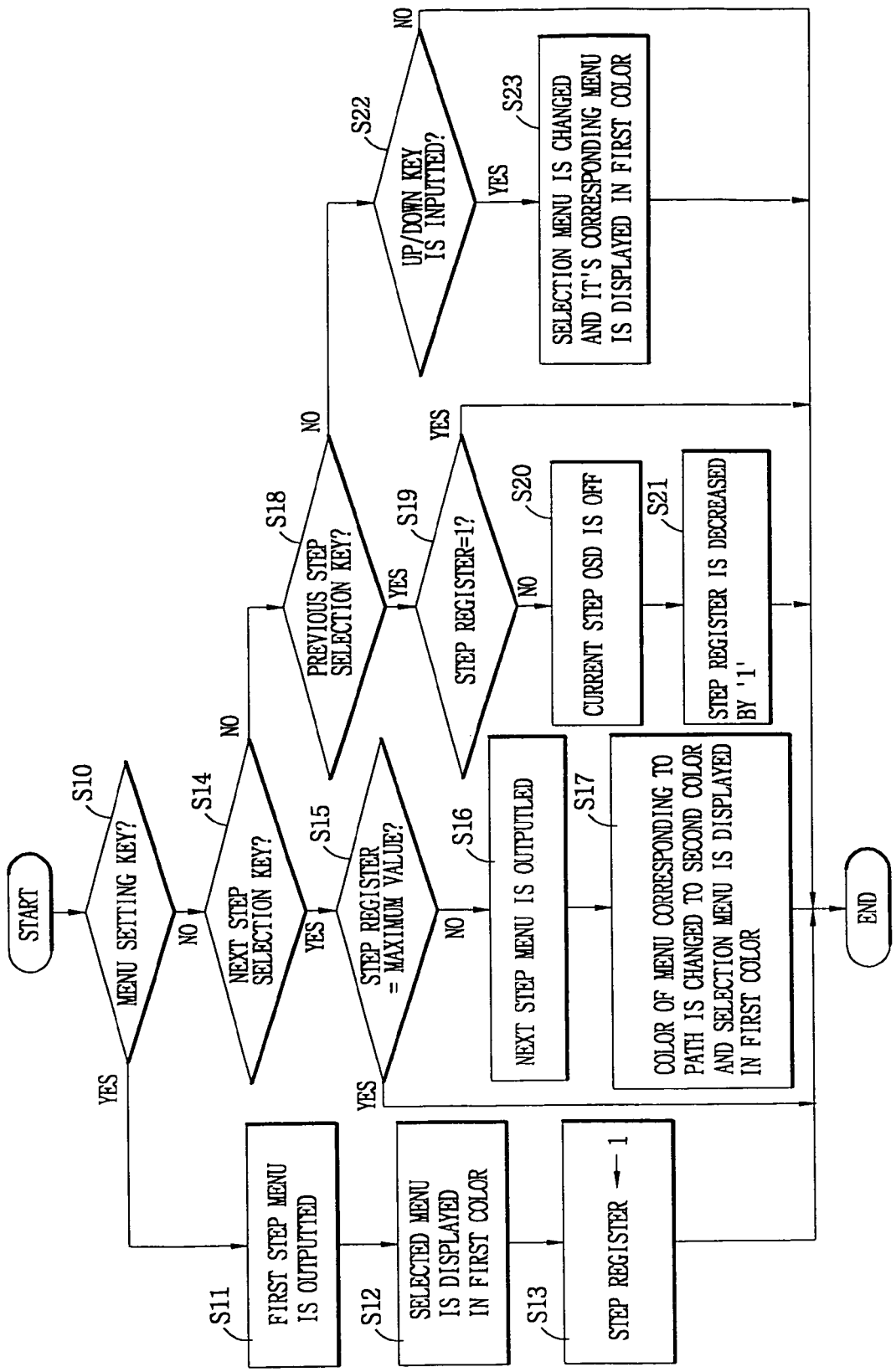
FIG. 3 is a flow chart of a first embodiment of a method for displaying a menu screen in accordance with the present invention.

FIG. 3 is a flow chart of a first embodiment of a method for displaying a menu screen in accordance with the present invention.

First, it is judged whether a menu setting key was pressed by the user (S10). If the menu setting key is pressed down, the first step menu is outputted (S11) and the selected menu is displayed in a first color, that is, red color (S12).

And, a step register for displaying the steps that are being displayed is set as '1' (S13).

Meanwhile, upon the judgement (S10), if the menu setting key was not inputted, it is judged whether the next step selection key was inputted (S14). Subsequently, upon the judgement (S14), if the next step selection key was inputted, it is judged whether the step register is of the maximum value (S15). If the step register is not of the maximum value, that is, if there exist the next step, the next step menu is outputted (S16), as shown in FIG. 4, the menu item corresponding to its path, that is, 'CH', is changed to a second color, blue color, and the selected menu 'FAVORITE CH' is displayed in the first color, that is, the red color (S17).

Figure 4:
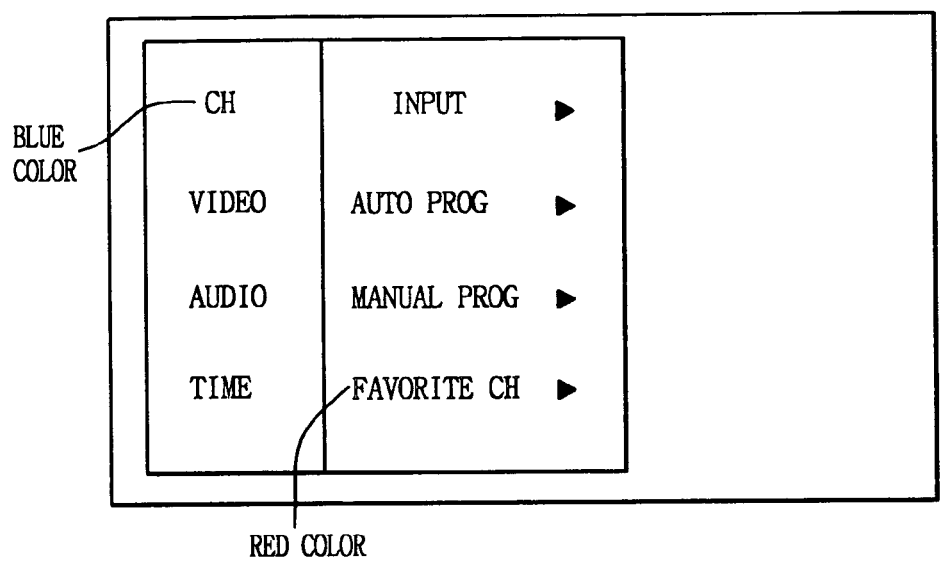
FIG. 4 shows menu screens of FIG. 3 in accordance with the present invention.
Figure 4:
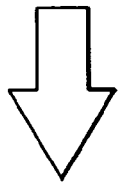
Figure 4:
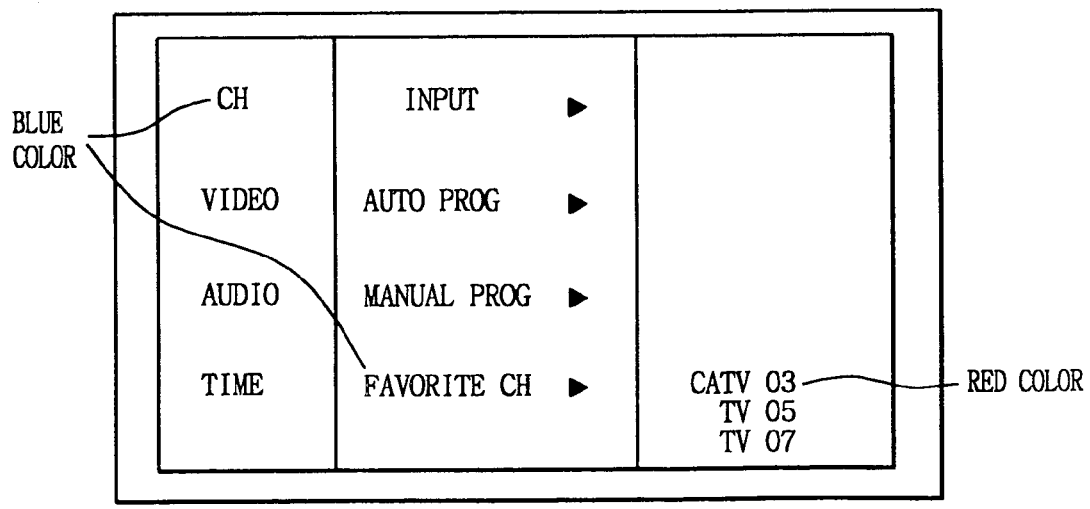
Figure 5:
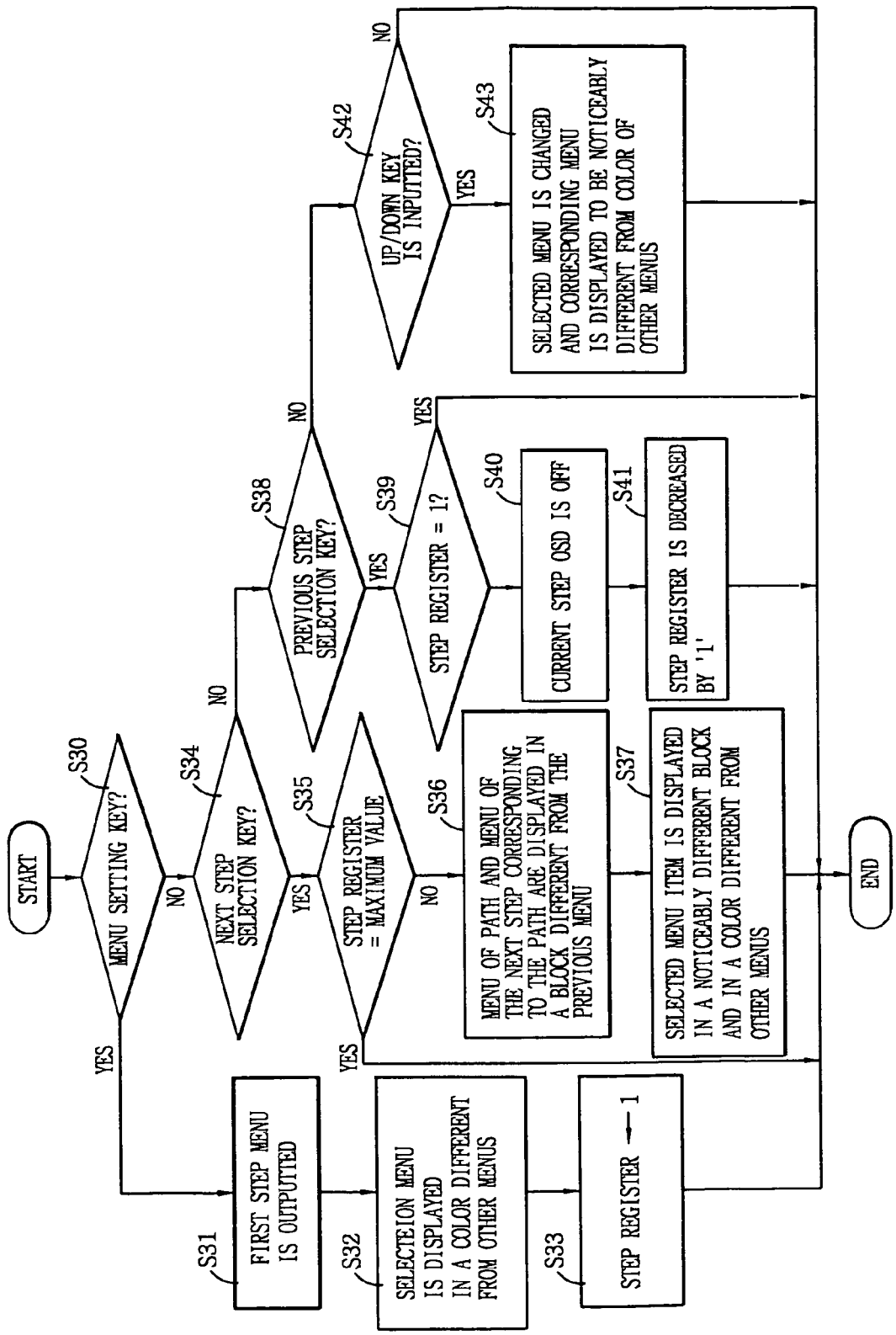
FIG. 5 is a flow chart of a second embodiment of a method for displaying a menu screen in accordance with the present invention.

And, if the next step selection key is again inputted, the step (S15) is performed, and as shown in FIG. 4, the next step menus (CATV 03, TV 05 and TV 07) are outputted (S16), the menu item corresponding to the path, that is, 'CH' and 'FAVORITE CH' are changed to be displayed in the second color, the blue color, and the current selection menu of 'CATV 03' is displayed in the first color, the red color.

Meanwhile, if a previous step selection key is inputted (S18), it is judged whether the step register is of '1' (S19). If the step register is not of '1', that is, if more than two steps are displayed on the current screen, the current step menu is turned OFF (S20) and the step register is reduced by '1' (S21).

If an up/turn key is inputted (S22), the selection menu item is changed and the corresponding menu is displayed in the first color, the red color (S23).

Consequently, according to the first embodiment of the present invention, the finally selected menu is displayed in the first color, that is, the red color, and the upper menus corresponding to its path are displayed in the uniform color of the second color, that is, the blue color, so that it is easy for the user to currently recognize the finally selected menu of him and its path.

The second embodiment of the present invention will now be described.

First, it is judged whether a menu setting key is pressed down by a user (S30). Upon the judgement, if the menu setting key was pressed down, the first step menu is outputted (S31), of which the selected menu is displayed in a different color from that of the other menus (S32), and the step register displaying the step that is currently being displayed is set as '1' (S33).

Meanwhile, upon the judgement (S30), if the menu setting key was not inputted, it is judged whether the next step selection key was inputted (S34). Upon the judgement, if the next step selection key was inputted, it is judged whether the step register is of the maximum value.

Figure 6:
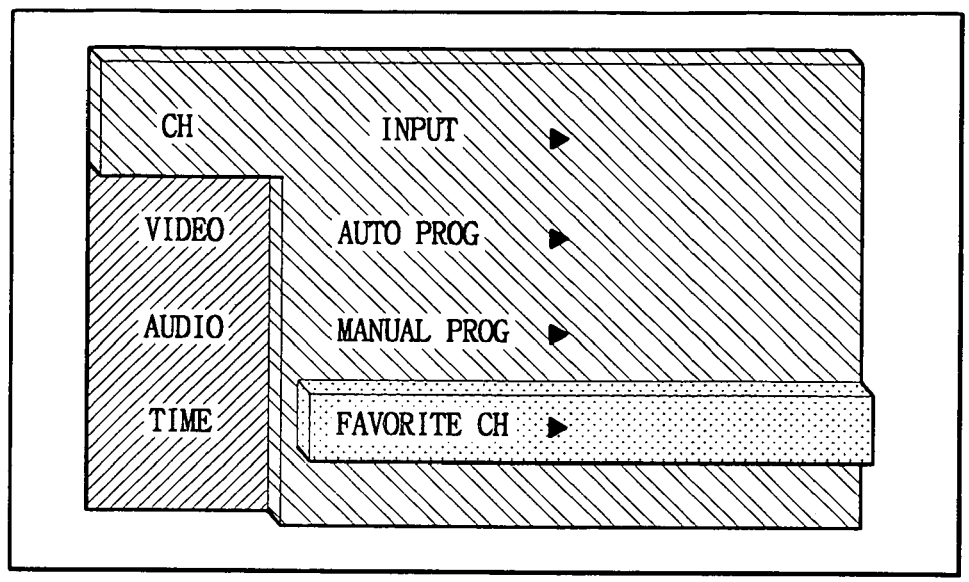
FIG. 6 shows menu screens of FIG. 3 in accordance with the present invention.
Figure 6:
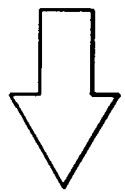
Figure 6:
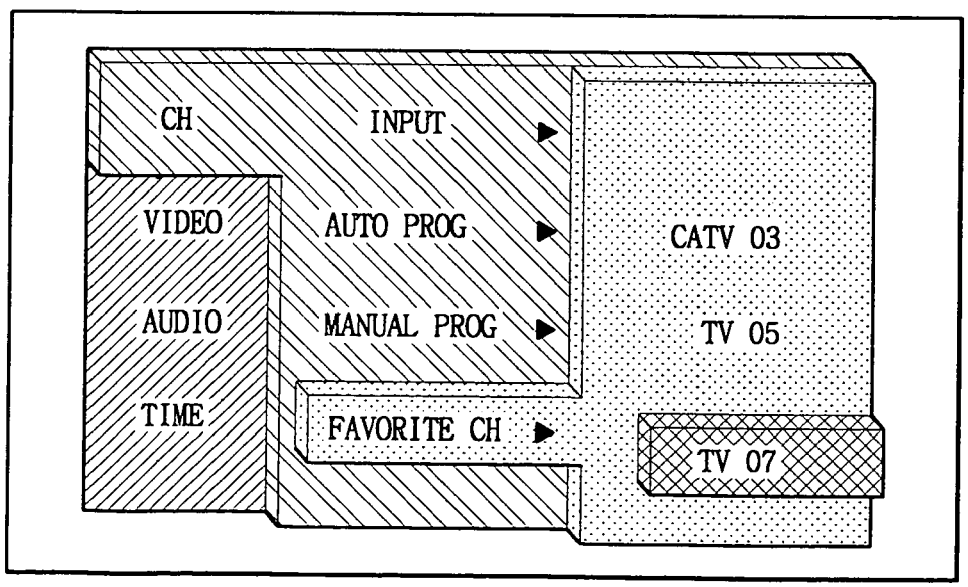

Subsequently, upon the judgment (S35), if the step register is not of the maximum value, that is, if there exists the next step, as shown in the upper portion of FIG. 6, the menu items of the next step, that is, 'INPUT', "AUTO PROG", "MANUAL PROG", and "FAVORITE CH" and the menu item corresponding to its path, that is "CH", are displayed in a block noticeably different from the previous menu (S36), and the again selected menu item, "FAVORITE CH", is displayed in a noticeably different block and in a color noticeably different from the other menus (S37). At this time, if the next step selection key is again inputted, as shown in the lower portion of FIG. 6, the finally selected menu item becomes "TV 07" in the same manner as described above.

In this respect, the block displaying 'CH' and its corresponding lower menus is displayed additionally so as to be differentiated from the block having the initial upper menus, as if it was on the different level. That is, the blocks are three-dimensionally displayed so that they are viewed by the user as if the block displaying 'CH' and its corresponding lower menus existed at a higher level than the block consisting of the initial upper menus.

Besides the methods mentioned above, as the menu selections are proceeding, the blocks are sequentially displayed to have a shading difference, that is, to be gradually brightened or darkened in the same color, or, each block may be differentiated in different colors to each other.

Meanwhile, if the previous step selection key is inputted (S38), it is judged whether the step register is of '1' (S39). If the step register is not of '1', that is, more than two steps are currently displayed on the screen, the current step menu is turned OFF (S40), and the step register is decreased by '1' (S41).

Resultantly, according to the second embodiment of the present invention, the selected menu and its lower menus are displayed in one block and the corresponding block is displayed at a higher level or at a lower level as if they it existed in the different level from the other block, and, each block can be displayed in the same color having shading different or in the different color, so that the user can easily recognize the menu selected by himself, which facilitates to operate menu selection by him.

The third embodiment of the present invention is obtained by adopting the first and the second embodiments. That is, the finally selected menu (TV 07) of the second embodiment is displayed in a specific color (red color) and the menus (FAVORITE CH, CATV 03 and TV 05) corresponding to the path are displayed in the same color (blue color) different from the specific color.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for displaying a menu screen on a video display apparatus, the menu screen comprising a menu level having a plurality of menus, each of which are displayed in a first color, wherein selecting a first menu from the plurality of menus causes a first lower menu level to be generated, the selected first menu and the first lower menu level being displayed in a second color that is different from the first color, and selecting a second menu from the first lower menu level causes a second lower menu level to be generated, the selected second menu and the second lower menu level being displayed in a third color that is different from the first and second colors;

wherein the menus and menu levels are displayed using blocks, and the selected first and second menus and the corresponding first and second lower menu levels are displayed on a different block from other menus and menu levels; and wherein each of the blocks is displayed three-dimensionally so as to show its height.

2. A method for displaying a menu screen on a video display apparatus, the menu screen comprising a menu level having a plurality of menus, each of which are displayed in a first color or shade, wherein selecting a first menu from the plurality of menus causes a first lower menu level to be generated, the selected first menu and first lower menu level being displayed on the menu screen in a second color or shade that is different from the first color or shade, and selecting a second menu from the first lower menu level causes a second lower menu level to be generated, the selected second menu and the second lower menu level being displayed in a third color or shade that is different from the first and second color or shade;

wherein the menus and menu levels are displayed using blocks, and the selected first and second menus and the corresponding first and second lower menu levels are displayed on a different block from other menus and menu levels; and wherein each of the blocks is displayed three-dimensionally so as to show its height.

3. A method for displaying a menu screen on a video display apparatus, the menu screen comprising a menu level having a plurality of menus, each of which are displayed in a first color or shade, wherein selecting a first menu from the plurality of menus causes a first lower menu level to be generated, the selected first menu and the first lower menu level being displayed in a second color or shade that is different from the first color or shade, and selecting a second menu from the first lower menu level causes a second lower menu level to be generated, the selected second menu and the second lower menu level being displayed in a third color or shade that is different from the first and second color or shade;

wherein the menus and menu levels are displayed using blocks, and the selected first and second menus and the corresponding first and second lower menu levels are displayed on a different block from other menus and menu levels; and wherein each of the blocks is displayed three-dimensionally so as to show its height.

4. A method for displaying a menu screen on a video display apparatus, the menu screen comprising a menu level having a plurality of menus, each of which are displayed in a first color or shade, wherein selecting a first menu from the plurality of menus causes a first lower menu level to be generated, the selected first menu and the first lower menu level being displayed in a second color or shade that is different from the first color or shade, and selecting a second menu from the first lower menu level causes a second lower menu level to be generated, the selected second menu being displayed in a third color or shade that is different from the second color or shade;

wherein the menus and menu levels are displayed using blocks, and the selected first and second menus and the corresponding first and second lower menu levels are displayed on a different block from other menus and menu levels; and wherein each of the blocks is displayed three-dimensionally so as to show its height.

5. The method according to claim 2, wherein the menus and menu levels are displayed using different shadings, and the selected first and second menus and the corresponding first and second lower menu levels are displayed using a shading that is different from the shadings of the other menus and menu levels.

6. The method according to claim 3, wherein the menus and menu levels are displayed using different shadings, and the selected first and second menus and the corresponding first and second lower menu levels are displayed using a shading that is different from the shadings of the other menus and menu levels.

7. The method according to claim 4, wherein the menus and menu levels are displayed using different shadings, and the selected first and second menus and the corresponding first and second lower menu levels are displayed using a shading that is different from the shadings of the other menus and menu levels.

* * * * *